United States Patent
Verma et al.

(10) Patent No.: US 11,764,920 B2
(45) Date of Patent: Sep. 19, 2023

(54) BACKOFF COUNTER AND TXOP DURATION SETTINGS FOR COORDINATED ACCESS POINT TRANSMISSIONS

(71) Applicant: QUALCOMM Incorporated, San Diego, CA (US)

(72) Inventors: Lochan Verma, San Diego, CA (US); George Cherian, San Diego, CA (US); Alfred Asterjadhi, San Diego, CA (US); Abhishek Pramod Patil, San Diego, CA (US); Sai Yiu Duncan Ho, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 260 days.

(21) Appl. No.: 16/882,341

(22) Filed: May 22, 2020

(65) Prior Publication Data

US 2020/0374062 A1 Nov. 26, 2020

Related U.S. Application Data

(60) Provisional application No. 62/851,619, filed on May 22, 2019.

(51) Int. Cl.
*H04L 5/00* (2006.01)
*H04B 7/024* (2017.01)
*H04W 72/27* (2023.01)
*H04W 84/12* (2009.01)

(52) U.S. Cl.
CPC .......... *H04L 5/0035* (2013.01); *H04B 7/024* (2013.01); *H04W 72/27* (2023.01); *H04W 84/12* (2013.01)

(58) Field of Classification Search
CPC ..... H04L 5/0035; H04B 7/024; H04B 7/0452; H04W 72/0426; H04W 84/12; H04W 72/0453; H04W 74/04
USPC .................................................. 370/311, 329
See application file for complete search history.

(56) References Cited

U.S. PATENT DOCUMENTS

| | | | | |
|---|---|---|---|---|
| 2014/0328264 A1* | 11/2014 | Merlin | ................. | H04W 16/10 370/329 |
| 2015/0098377 A1* | 4/2015 | Amini | ................. | H04W 36/06 370/311 |
| 2016/0323849 A1* | 11/2016 | Chu | ................. | H04W 72/04 |
| 2016/0360528 A1* | 12/2016 | Kim | ................. | H04L 27/2602 |

(Continued)

*Primary Examiner* — Kwang B Yao
*Assistant Examiner* — Syed M Bokhari
(74) *Attorney, Agent, or Firm* — Holland & Hart LLP

(57) ABSTRACT

This disclosure provides systems, methods and apparatuses for wireless communications. In some implementations, a first access point (AP) may identify other APs to participate in a coordinated access point transmission session, may obtain a transmit opportunity (TXOP) for transmitting wireless signals over a frequency bandwidth, may allocate corresponding portions of the frequency bandwidth to the identified APs for downlink (DL) transmissions during the TXOP, may select a duration of the TXOP for the coordinated access point transmission session based at least in part on an amount or percentage of the first AP's frequency bandwidth that is allocated to the one or more identified APs for the coordinated access point transmission session, and may output information indicative of at least one of the selected TXOP duration or the corresponding portions of the frequency bandwidth allocated to the respective identified AP by the first AP.

22 Claims, 12 Drawing Sheets

(56) References Cited

U.S. PATENT DOCUMENTS

| | | | |
|---|---|---|---|
| 2018/0103390 A1* | 4/2018 | Zhou | H04W 28/0252 |
| 2020/0045555 A1* | 2/2020 | Huang | H04W 4/06 |
| 2020/0245352 A1* | 7/2020 | Seok | H04W 52/367 |
| 2021/0409958 A1* | 12/2021 | Huang | H04W 88/08 |

* cited by examiner

900

902

Transmitting DL data on a portion of the frequency bandwidth reserved for the first AP concurrently with the transmissions of DL data from the one or more identified APs on their respective allocated portions of the frequency bandwidth.

Temporally aligning DL transmissions from the first AP with DL transmissions from the one or more identified APs.

Adjusting the TXOP duration based on increases or decreases in the percentage or amount of the frequency bandwidth that is allocated to the one or more identified APs for one or more subsequent coordinated access point transmission sessions.

*Figure 10*

BACKOFF COUNTER AND TXOP DURATION SETTINGS FOR COORDINATED ACCESS POINT TRANSMISSIONS

CROSS-REFERENCE TO RELATED APPLICATIONS

This Patent Application claims priority to U.S. Provisional Patent Application No. 62/851,619 entitled "BACKOFF COUNTER AND TXOP DURATION SETTINGS FOR COORDINATED ACCESS POINT TRANSMISSIONS" and filed on May 22, 2019, which is assigned to the assignee hereof. The disclosures of all prior Applications are considered part of and are incorporated by reference in this Patent Application.

TECHNICAL FIELD

This disclosure relates generally to wireless communication, and specifically to coordinated data transmissions from multiple access points.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many wireless networks use random channel access mechanisms to control access to a shared wireless medium. In these wireless networks, wireless devices (including APs and STAs) contend with each other to gain access to the wireless medium. The wireless device that wins the contention operation becomes the owner of a transmission opportunity (TXOP) and may use the wireless medium for a duration of the TXOP. Other wireless devices are typically prevented from transmitting data during the TXOP, for example, to prevent interference with transmissions from the TXOP owner.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a first access point (AP), and may include identifying one or more other APs to participate with the first AP in a coordinated access point transmission session, obtaining a transmit opportunity (TXOP) for transmitting wireless signals over a frequency bandwidth, allocating, to each AP of the one or more identified APs, a corresponding portion of the frequency bandwidth for downlink (DL) transmissions during the TXOP, selecting a duration of the TXOP for the coordinated access point transmission session based at least in part on an amount or percentage of the first AP's frequency bandwidth that is allocated to the one or more identified APs for the coordinated access point transmission session, and outputting, to each AP of the one or more identified APs, information indicative of at least one of the selected TXOP duration or the corresponding portion of the frequency bandwidth allocated to the respective identified AP by the first AP. In some implementations, the selected TXOP duration is greater than a standard TXOP duration by a value proportional to the percentage or the amount.

In some implementations, the method may further include transmitting DL data on a portion of the frequency bandwidth reserved for the first AP concurrently with the transmissions of DL data from the one or more identified APs on their respective allocated portions of the frequency bandwidth. In some other implementations, the method may further include adjusting the TXOP duration based on increases or decreases in the percentage or amount of the frequency bandwidth that is allocated to the one or more identified APs for one or more subsequent coordinated access point transmission sessions. In some other implementations, the method may further include indicating, to each of the one or more identified APs, an ability to contend for medium access during a next contention period using the paused values of their respective back-off counters.

In some implementations, the method may further include temporally aligning DL transmissions from the first AP with DL transmissions from the one or more identified APs. In some instances, the DL transmissions may be temporally aligned by temporally aligning one or more symbol boundaries of a protocol data unit to be transmitted from the first AP with corresponding symbol boundaries of a protocol data unit to be concurrently transmitted from at least one of the identified APs. In some other instances, the temporally aligning further includes transmitting, to each AP of the one or more identified APs, a trigger frame indicating timing information of the one or more symbol boundaries of the protocol data unit to be transmitted from the first AP.

In some implementations, identifying the one or more other APs may include advertising the coordinated access point transmission session, receiving, from each AP of one or more nearby APs, an intent to participate in the coordinated access point transmission session, and identifying the one or more APs participating in the coordinated access point transmission session based on the received responses.

In some implementations, obtaining the TXOP may include contending for medium access based on decrementing a back-off counter during successive contention periods, gaining medium access and commencing the TXOP based on the back-off counter being less than a value, and indicating, to each of the one or more identified APs, an ability to pause decrementing of their respective back-off counters during the TXOP based on their participation in the coordinated access point transmission session.

In some implementations, allocating corresponding portions of the frequency bandwidth to the identified APs may include transmitting, to each AP of the one or more identified APs, a request for a preferred bandwidth to be allocated by the first AP for the coordinated access point transmission session, receiving, from each AP of the one or more identified APs, a response indicating the preferred bandwidth to be allocated by the first AP, and determining the corresponding portions of the frequency bandwidth to be allocated based on at least one of the preferred bandwidths indicated by the one or more identified APs. In some instances, the responses may also indicate a preferred number of spatial streams to be used by the respective identified AP for the coordinated access point transmission session.

In some implementations, outputting the information may include transmitting, to each AP of the one or more identified APs, a frame indicating at least one of a width and a location of the corresponding portion of the frequency bandwidth allocated by the first AP to the respective identified AP, a duration of the TXOP associated with the coordinated access point transmission session, or the number of spatial streams to be used by the respective identified AP for DL transmissions during the TXOP. In some instances, the corresponding portions of the frequency bandwidth allocated by the first AP include one or more of resource units, a primary channel, or a secondary channel.

Another innovative aspect of the subject matter described in this disclosure can be implemented in a wireless communication device. In some implementations, the wireless communication device may be a first access point (AP) including at least one modem, at least one processor communicatively coupled with the at least one modem, and at least one memory communicatively coupled with the at least one processor and storing processor-readable code. In some implementations, execution of the processor-readable code by the at least one processor causes the first AP to perform operations including identifying one or more other APs to participate with the first AP in a coordinated access point transmission session, obtaining a transmit opportunity (TXOP) for transmitting wireless signals over a frequency bandwidth, allocating, to each AP of the one or more identified APs, a corresponding portion of the frequency bandwidth for downlink (DL) transmissions during the TXOP, selecting a duration of the TXOP for the coordinated access point transmission session based at least in part on an amount or percentage of the first AP's frequency bandwidth that is allocated to the one or more identified APs for the coordinated access point transmission session, and outputting, to each AP of the one or more identified APs, information indicative of at least one of the selected TXOP duration or the corresponding portion of the frequency bandwidth allocated to the respective identified AP by the first AP. In some implementations, the selected TXOP duration is greater than a standard TXOP duration by a value proportional to the percentage or the amount.

In some implementations, the operations may further include transmitting DL data on a portion of the frequency bandwidth reserved for the first AP concurrently with the transmissions of DL data from the one or more identified APs on their respective allocated portions of the frequency bandwidth. In some other implementations, the operations may further include adjusting the TXOP duration based on increases or decreases in the percentage or amount of the frequency bandwidth that is allocated to the one or more identified APs for one or more subsequent coordinated access point transmission sessions. In some other implementations, the operations may further include indicating, to each of the one or more identified APs, an ability to contend for medium access during a next contention period using the paused values of their respective back-off counters.

In some implementations, the operations may further include temporally aligning DL transmissions from the first AP with DL transmissions from the one or more identified APs. In some instances, the DL transmissions may be temporally aligned by temporally aligning one or more symbol boundaries of a protocol data unit to be transmitted from the first AP with corresponding symbol boundaries of a protocol data unit to be concurrently transmitted from at least one of the identified APs. In some other instances, the temporally aligning further includes transmitting, to each AP of the one or more identified APs, a trigger frame indicating timing information of the one or more symbol boundaries of the protocol data unit to be transmitted from the first AP.

In some implementations, identifying the one or more other APs may include advertising the coordinated access point transmission session, receiving, from each AP of one or more nearby APs, an intent to participate in the coordinated access point transmission session, and identifying the one or more APs participating in the coordinated access point transmission session based on the received responses.

In some implementations, obtaining the TXOP may include contending for medium access based on decrementing a back-off counter during successive contention periods, gaining medium access and commencing the TXOP based on the back-off counter being less than a value, and indicating, to each of the one or more identified APs, an ability to pause decrementing of their respective back-off counters during the TXOP based on their participation in the coordinated access point transmission session.

In some implementations, allocating corresponding portions of the frequency bandwidth to the identified APs may include transmitting, to each AP of the one or more identified APs, a request for a preferred bandwidth to be allocated by the first AP for the coordinated access point transmission session, receiving, from each AP of the one or more identified APs, a response indicating the preferred bandwidth to be allocated by the first AP, and determining the corresponding portions of the frequency bandwidth to be allocated based on at least one of the preferred bandwidths indicated by the one or more identified APs. In some instances, the response further indicates a preferred number of spatial streams to be used by the respective identified AP for the coordinated access point transmission session.

In some implementations, outputting the information may include transmitting, to each AP of the one or more identified APs, a frame indicating at least one of a width and a location of the corresponding portion of the frequency bandwidth allocated by the first AP to the respective identified AP, a duration of the TXOP associated with the coordinated access point transmission session, or the number of spatial streams to be used by the respective identified AP for DL transmissions during the TXOP. In some instances, the corresponding portions of the frequency bandwidth allocated by the first AP include one or more of resource units, a primary channel, or a secondary channel.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 9A shows a flowchart illustrating an example process for wireless communication according to some other implementations.

FIG. 9B shows a flowchart illustrating an example process for wireless communication according to some other implementations.

FIG. 10 shows a flowchart illustrating an example process for wireless communication according to some other implementations.

Like reference numbers and designations in the various drawings indicate like elements.

DETAILED DESCRIPTION

Figure 1:
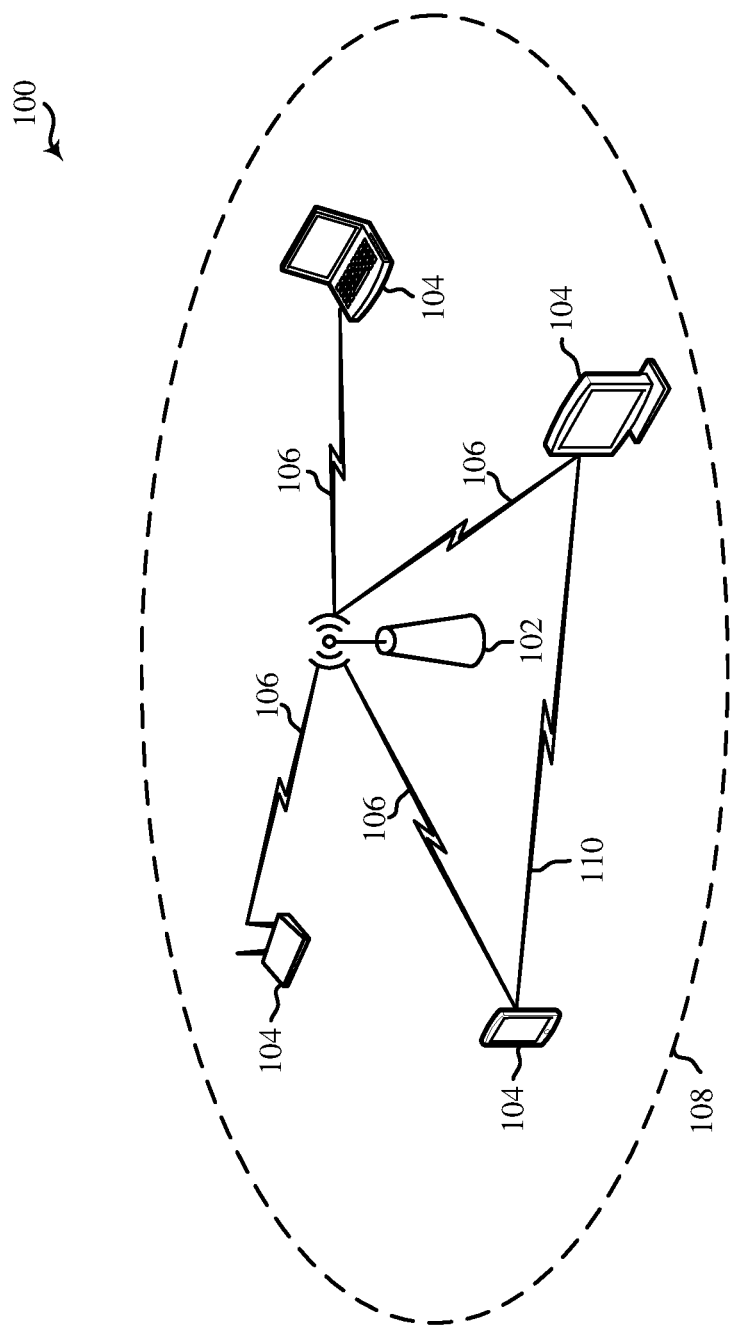
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to sharing frequency resources associated with a TXOP with other wireless devices. Some implementations more specifically relate to a first AP sharing frequency resources associated with an obtained TXOP with one or more other nearby APs for downlink (DL) transmissions during the TXOP. In some implementations, the first AP may win a medium access contention operation with other nearby APs and become the owner of a TXOP for transmitting wireless signals over a frequency bandwidth. The first AP may identify a number of other APs with which to share one or more portions of the TXOP for a coordinated access point transmission session during which multiple APs transmit DL data to client devices in their respective BSSs. In some implementations, the first AP may receive information indicating whether one or more nearby APs are capable of participating in the coordinated access point transmission session, and if so, their preferred frequency bandwidths and preferred number of spatial streams for transmitting DL data during the TXOP.

Particular implementations of the subject matter described in this disclosure can be implemented to realize one or more of the following potential advantages. By allowing a group of APs to participate in a coordinated access point transmission session in which the group of APs may share access to the wireless medium irrespective of which AP owns a given TXOP, aspects of the present disclosure may improve medium utilization, reduce congestion on the wireless medium, and increase the degree to which fairness may be provided for accessing and using the wireless medium.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
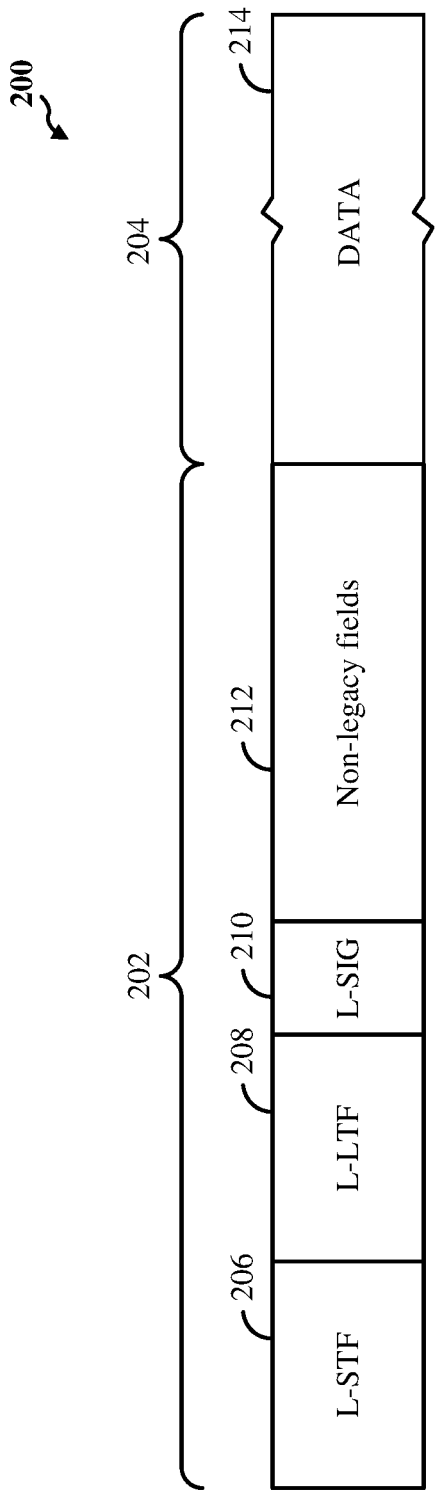
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
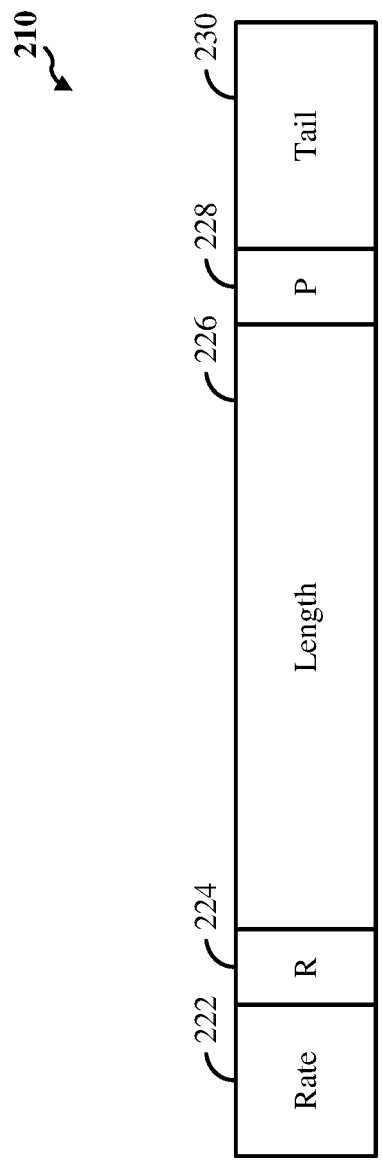
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
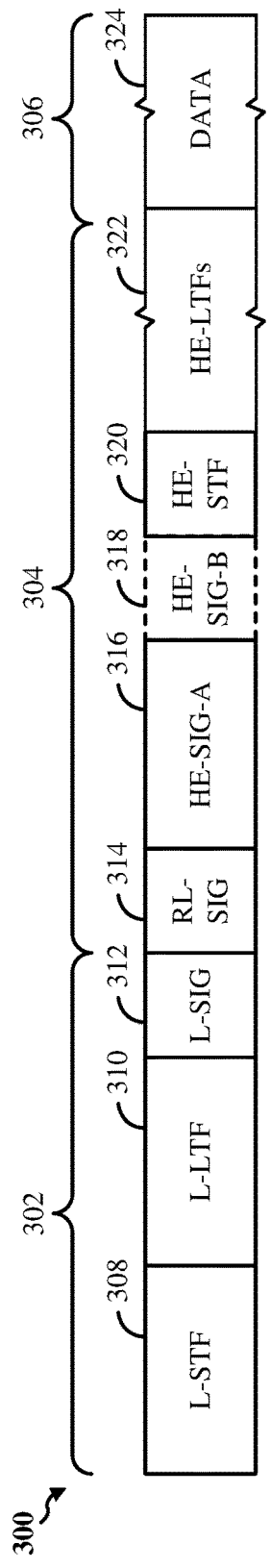
FIG. 3A shows an example PDU usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
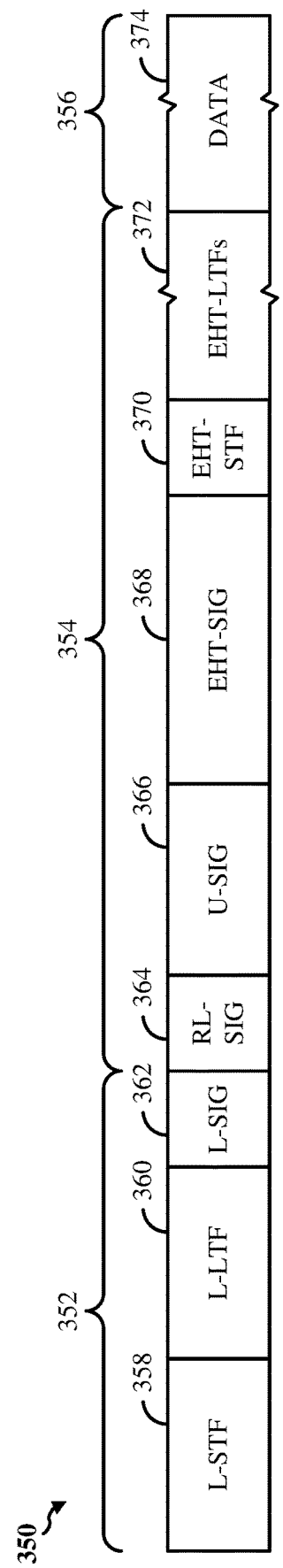
FIG. 3B shows another example PDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

FIG. 3C shows an example signal field 380 that may be carried in a WLAN PPDU. In implementations for which the signal field 380 is carried in an HE PPDU, the signal field 380 may be, or may correspond to, a HE-SIG-A field (such as the HE-SIG-A field 316 of the PPDU 300 of FIG. 3A). In implementations for which the signal field 380 is carried in an EHT PPDU, the signal field 380 may be, or may correspond to, an EHT-SIG field (such as the EHT-SIG field 368 of the PPDU 350 of FIG. 3B). The signal field 380 may include an UL/DL subfield 382 indicating whether the PPDU 400 is sent UL or DL, may include a SIGB-MCS subfield 384 indicating the MCS for the HE-SIGB field 412, and may include a SIGB DCM subfield 386 indicating whether or not the HE-SIG-B field 412 is modulated with dual carrier modulation (DCM). The signal field 380 may further include a BSS color field 388 indicating a BSS color identifying the BSS. Each device in a BSS may identify itself with the same BSS color. Thus, receiving a transmission having a different BSS color indicates the transmission is from another BSS, such as an OBSS.

The signal field 380 may further include a spatial reuse subfield 390 indicating whether spatial reuse is allowed during transmission of the corresponding PPDU. The signal field 380 may further include a bandwidth subfield 392 indicating a bandwidth of the PPDU data field, such as 20 MHz, 40 MHz, 80 MHz, 160 MHz, and so on. The signal field 380 may further include a number of HE-SIG-B symbols or MU-MIMO users subfield 394 indicating either a number of OFDM symbols in the HE-SIG-B field 412 or a number of MU-MIMO users. The signal field 380 may further include a SIGB compression subfield 396 indicating whether or not a common signaling field is present, may include a GI+LTF size subfield 398 indicating the guard interval (GI) duration and the size of the non-legacy LTFs. The signal field 380 may further include a doppler subfield 399 indicating whether a number of OFDM symbols in the PPDU data field is larger than a signaled midamble periodicity plus one, and the midamble is present, or that the number of OFDM symbols in the PPDU data field data field 418 is less than or equal to the signaled midamble periodicity plus 1, that the midamble is not present, but that the channel is fast varying.

Figure 4:
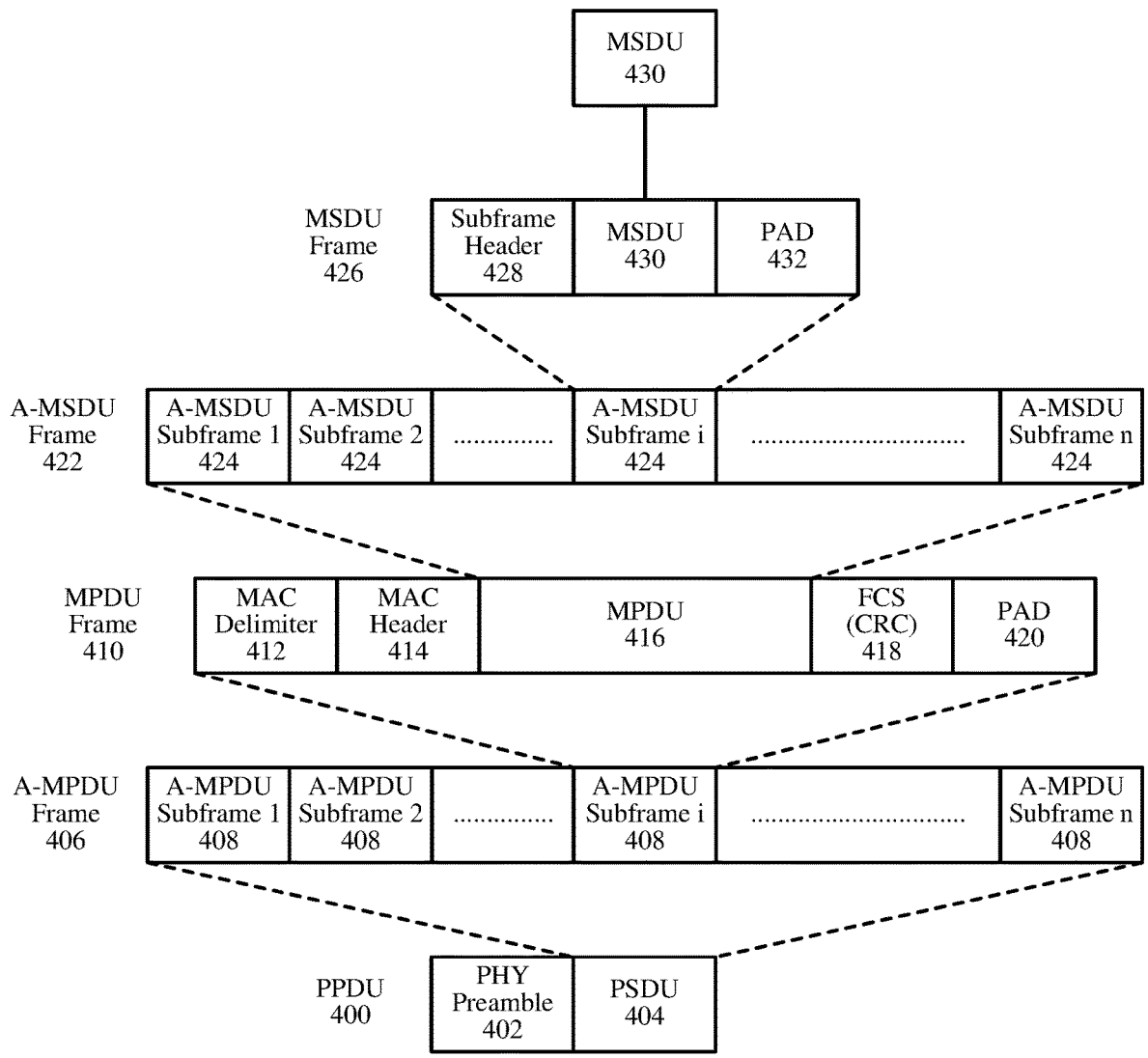
FIG. 4 shows an example physical layer convergence protocol (PLCP) protocol data unit (PPDU) usable for communications between an AP and one or more STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which comprises the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
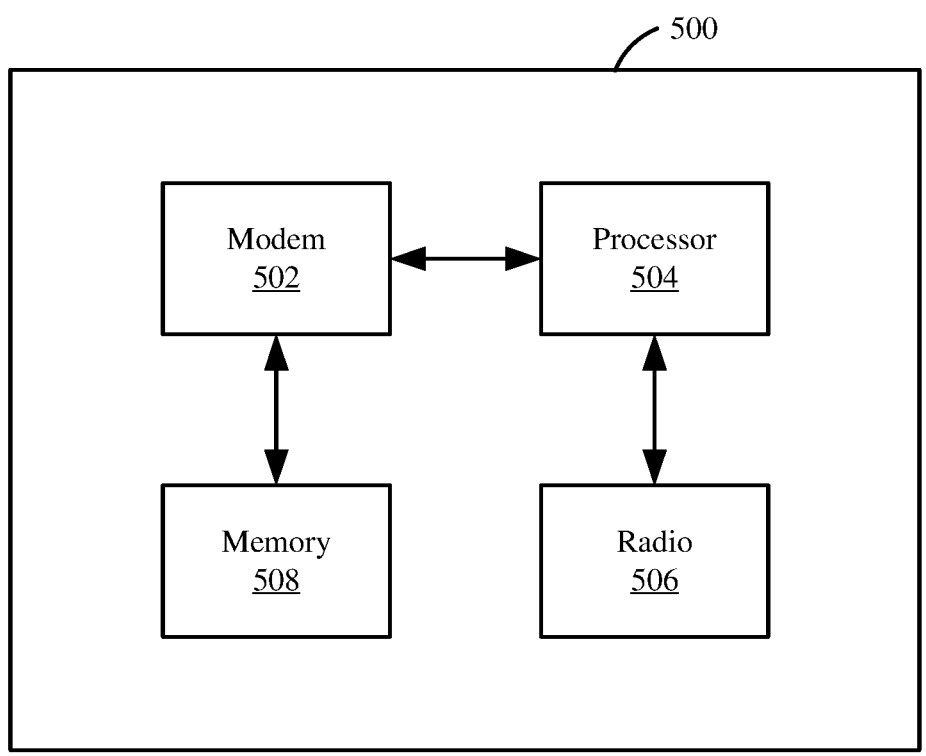
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more processors, processing blocks or processing elements 504 (collectively "the processor 504") coupled with the modem 502. In some implementations, the wireless communication device 500 additionally includes one or more radios 506 (collectively "the radio 506") coupled with the modem 502. In some implementations, the wireless communication device 500 further includes one or more memory blocks or elements 508 (collectively "the memory 508") coupled with the processor 504 or the modem 502.

The modem 502 can include an intelligent hardware block or device such as, for example, an application-specific integrated circuit (ASIC), among other examples. The modem 502 is generally configured to implement a PHY layer, and in some implementations, also a portion of a MAC layer (for example, a hardware portion of the MAC layer). For example, the modem 502 is configured to modulate packets and to output the modulated packets to the radio 506 for transmission over the wireless medium. The modem 502 is similarly configured to obtain modulated packets received by the radio 506 and to demodulate the packets to provide demodulated packets. In addition to a modulator and a demodulator, the modem 502 may further include digital signal processing (DSP) circuitry, automatic gain control (AGC) circuitry, a coder, a decoder, a multiplexer and a demultiplexer. For example, while in a transmission mode, data obtained from the processor 506 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 506. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 506, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 506) for processing, evaluation or interpretation.

The radio 506 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 506, which then transmits the symbols via the coupled antennas. Similarly, symbols received via the antennas are obtained by the radio 506, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 506 and the modem 502, and processes information to be output through the modem 502 and the radio 506 for transmission through the wireless medium. For example, the processor 506 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
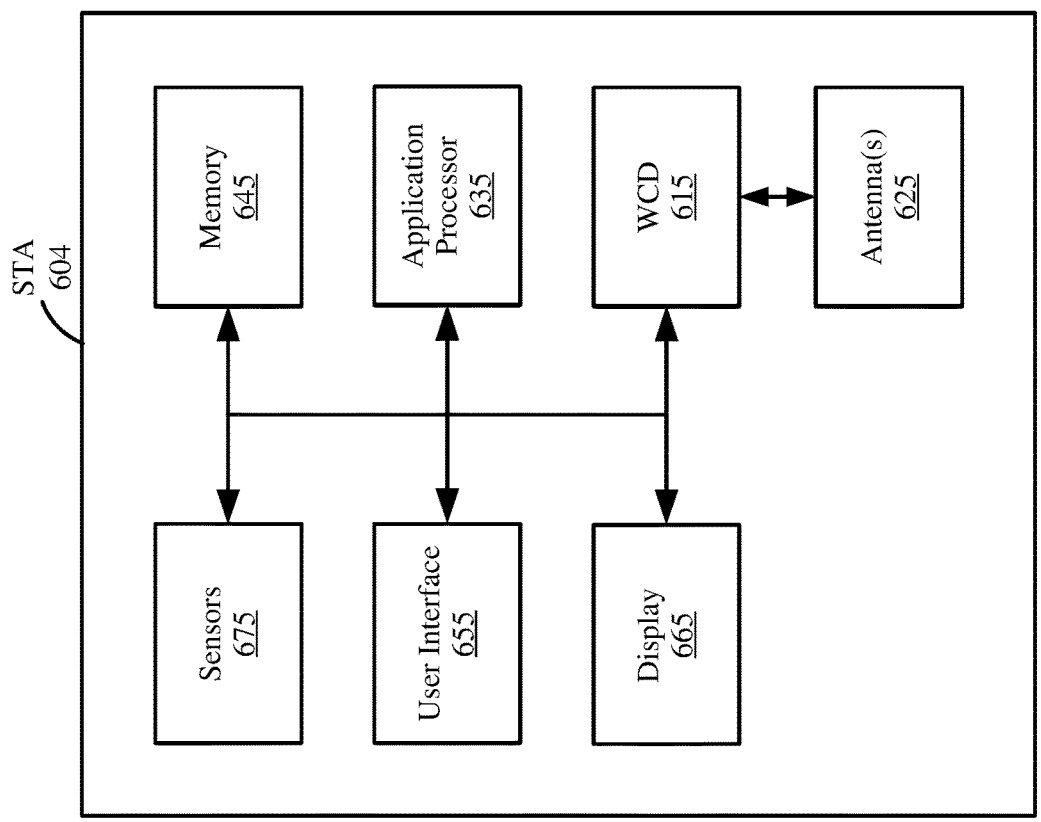
FIG. 6B shows a block diagram of an example STA.
Figure 6A:
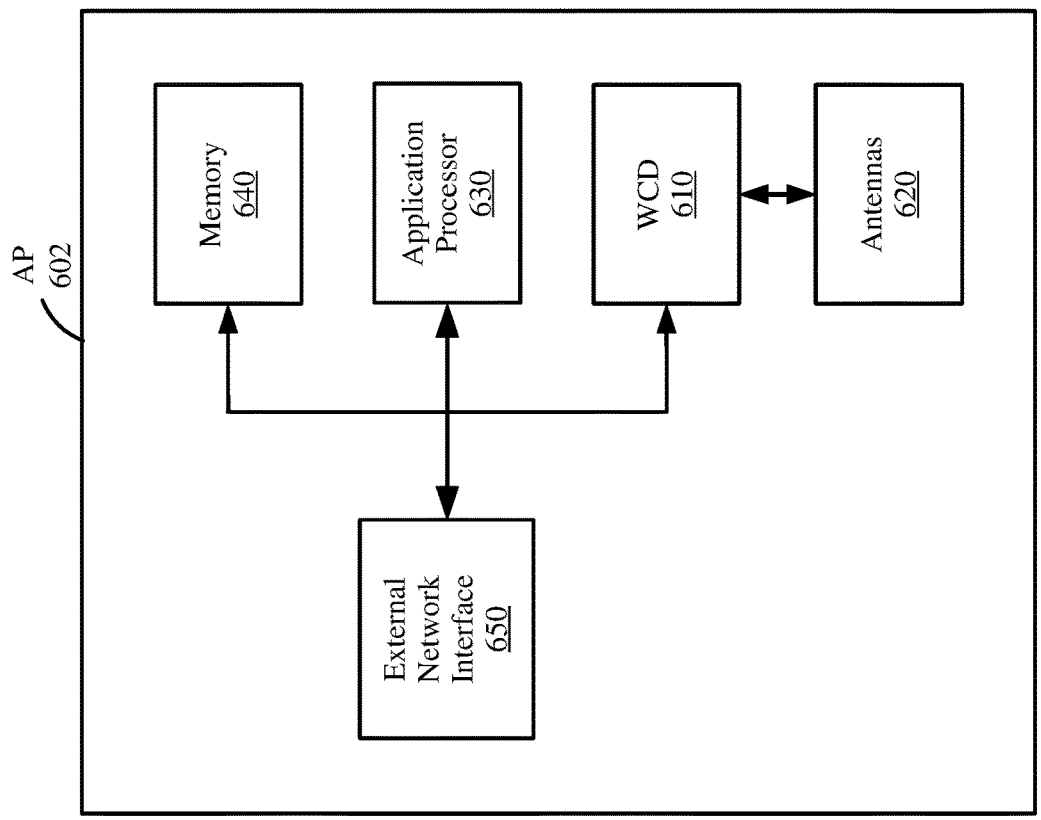
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As mentioned above, many wireless networks use random channel access mechanisms to control access to a shared wireless medium, for example, such that after a particular wireless device becomes the owner or otherwise obtains a TXOP, only the particular wireless device transmits data during the TXOP. In wireless networks compliant with the IEEE 802.11ax standards, nearby APs typically do not communicate with each other, and do not coordinate their DL transmissions with each other, even in instances where a group of nearby APs is within a vicinity of each other such that the group of APs essentially share access to the frequency bandwidth of a wireless medium (such that each of the APs in the group contend with each other for medium access).

Various implementations relate generally to sharing frequency resources associated with a TXOP with other wireless devices. Some implementations more specifically relate to a first AP sharing frequency resources associated with an obtained TXOP with one or more other nearby APs for downlink (DL) transmissions during the TXOP. In some implementations, the first AP may win a medium access contention operation with other nearby APs and become the owner of a TXOP for transmitting wireless signals over a frequency bandwidth. The first AP may identify a number of other APs with which to share one or more portions of the TXOP for a coordinated access point transmission session during which multiple APs transmit DL data to client devices in their respective BSSs. In some implementations, the first AP may receive information indicating whether one or more nearby APs are capable of participating in the coordinated access point transmission session, and if so, their preferred frequency bandwidths and preferred number of spatial streams for transmitting DL data during the TXOP.

In some implementations, the first AP may allocate a corresponding portion of the frequency bandwidth to each of the identified APs for DL transmissions during the TXOP. The first AP may output information indicative of the locations of the allocated portions of the frequency bandwidth, a duration of protocol data units (PPDUs) to be transmitted by the identified APs, and the TXOP duration to the identified APs. In some aspects, the TXOP duration may be greater than the duration of the PPDUs to be transmitted by the identified APs. Once received, the information may be communicated by each of the identified APs to a number of client devices in their respective BSSs, for example, so that the client devices in a given BSS are aware of the particular bandwidth or channel upon which to expect a DL data transmission during the TXOP.

In some implementations, the first AP may be rewarded for sharing frequency resources associated with the TXOP by allowing the first AP to increase the duration of the TXOP. According to some aspects, the first AP may select a duration of the TXOP based on an amount of the frequency bandwidth that was allocated to the identified APs. In one or more implementations, the first AP may increase the duration of the TXOP by a factor of N, where N indicates an amount or percentage of the frequency bandwidth allocated by first AP to the identified APs. For example, if the first AP allocates 1/N=½ of the frequency bandwidth to the identified APs, the first AP may increase the TXOP duration by a factor of N=2. In addition, or in the alternative, the first AP may adjust the TXOP duration based on increases or decreases in the percentage or amount of the frequency bandwidth allocated to the identified APs for one or more subsequent coordinated access point transmission sessions.

In some implementations, each of the identified APs may be rewarded for participating in the coordinated access point transmission session by pausing its back-off counter during the TXOP. Each of the identified APs may use the paused back-off counter to contend for medium access during a next contention period, for example, rather than selecting a new random back-off number. Allowing the identified APs to use the paused back-off counter for the next contention period may increase the likelihood that the identified APs win medium access during the next medium access contention period, for example, as compared with selecting new back-off number. In other implementations, each of the identified APs may reset its back-off counter for the next contention period.

In some implementations, the first AP may identify the APs to participate in the coordinated access point transmission session by receiving capability information of a number of nearby APs, and using the received capability information to determine or select the identified APs with which to share portions of the frequency bandwidth during the TXOP. During the TXOP, the first AP may transmit DL data on a reserved portion of the frequency bandwidth concurrently with the transmission of DL data from each of the identified APs on their allocated portions of the frequency bandwidth. The DL transmissions may include one or more of single-user multiple-input multiple-output (SU-MIMO) transmissions, multi-user MIMO (MU-MIMO) transmissions, or orthogonal frequency-division multiple access (OFDMA) transmissions.

In some implementations, DL transmissions from the first AP may be temporally aligned with DL transmissions from the identified APs based on a number of symbol boundaries of protocol data units transmitted from each of the APs. In some aspects, the first AP may transmit, to each of the identified APs, a trigger frame including synchronization information configured to temporally align a number of symbol boundaries of protocol data units to be transmitted from the identified APs with each other, with a number of symbol boundaries of protocol data units to be transmitted from the first AP, or both. In some aspects, number of symbol boundaries correspond to at least one of a HE-SIG-B field, an HE-LTF field, or an end of the packet.

Particular implementations of the subject matter described in this disclosure can be implemented to realize one or more of the following potential advantages. By allowing a group of APs to participate in a coordinated access point transmission session in which the group of APs may share access to the wireless medium irrespective of which AP owns a given TXOP, aspects of the present disclosure may improve medium utilization, reduce congestion on the wireless medium, and increase the degree to which fairness may be provided for accessing and using the wireless medium.

Figure 7:
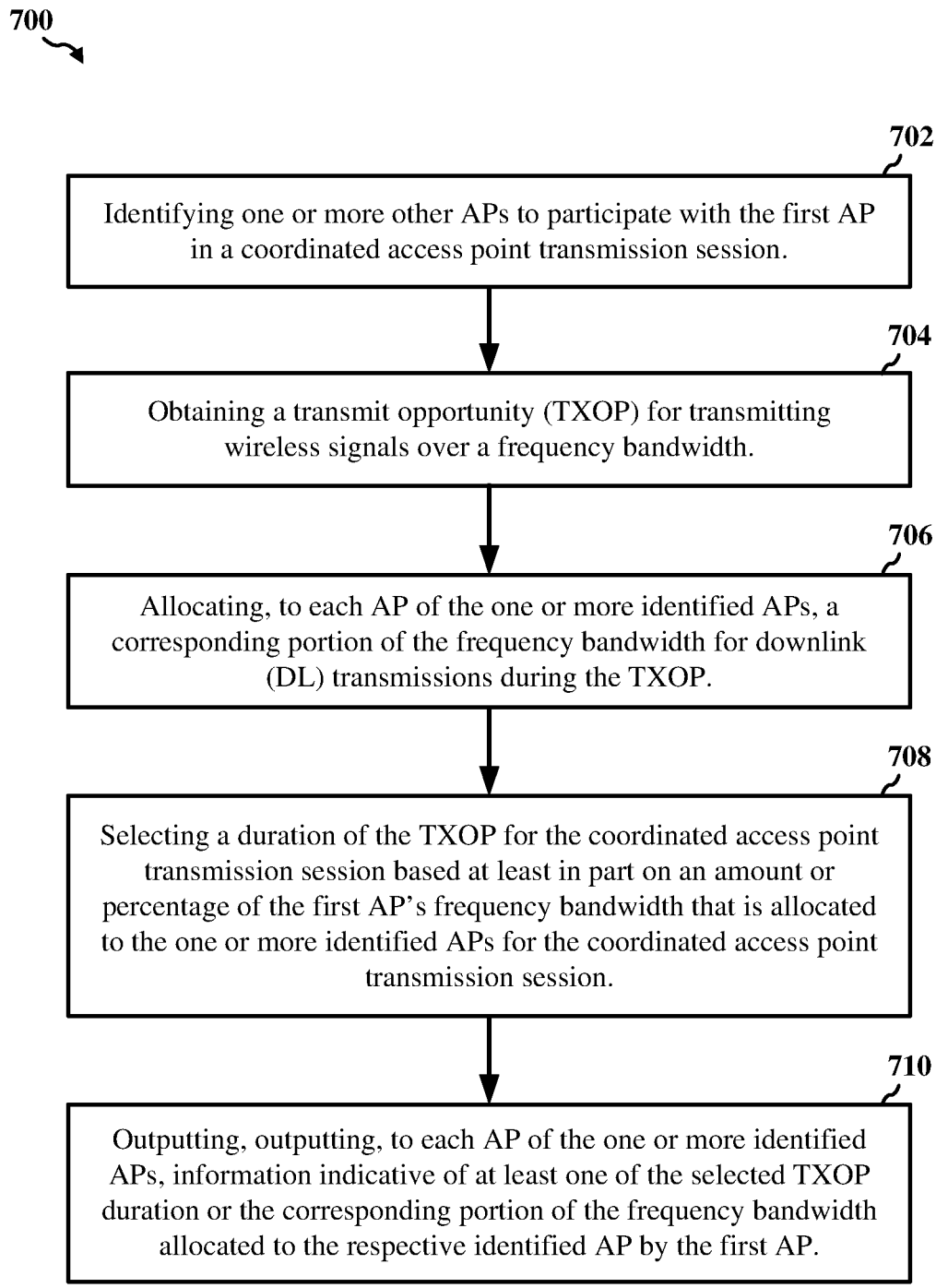
FIG. 7 shows a flowchart illustrating an example process for wireless communication according to some implementations.

FIG. 7 shows a flowchart illustrating an example process 700 for wireless communication according to some implementations. The process 700 may be performed by a wireless communication device such as the wireless communication device 500 described above with reference to FIG. 5. In some implementations, the process 700 may be performed by a wireless communication device operating as or within an AP, such as one of the APs 102 and 602 described above with reference to FIGS. 1 and 6A, respectively.

In some implementations, the process 700 is performed by a first AP and begins in block 702 with identifying one or more other APs to participate with the first AP in a coordinated access point transmission session. In block 704, the process 700 proceeds with obtaining a transmit opportunity (TXOP) for transmitting wireless signals over a frequency bandwidth. In block 706, the process 700 proceeds with allocating, to each AP of the one or more identified APs, a corresponding portion of the frequency bandwidth for downlink (DL) transmissions during the TXOP. In block 708, the process 700 proceeds with selecting a duration of the TXOP for the coordinated access point transmission session based at least in part on an amount or percentage of the first AP's frequency bandwidth that is allocated to the one or more identified APs for the coordinated access point transmission session. In block 710, the process 700 proceeds with outputting, to each AP of the one or more identified APs, information indicative of at least one of the selected TXOP duration or the corresponding portion of the frequency bandwidth allocated to the respective identified AP by the first AP.

In some implementations, identifying the one or more other APs in block 702 may include determining a portion of the frequency bandwidth to be allocated to each of the identifying other APs based on one or more of their respective preferred frequency bandwidths or their respective preferred number of spatial streams.

In some implementations, obtaining the TXOP in block 704 includes contending with other wireless communication devices for medium access, winning a medium access contention operation and becoming the owner of a TXOP for transmitting wireless signals over a frequency bandwidth, and identifying one or more other APs with which to share one or more portions of the frequency bandwidth during the TXOP.

In some implementations, allocating portions of the frequency bandwidth to the identified other APs in block 706 may be based on indications of the preferred bandwidths and preferred number of spatial streams of the identified other APs.

In some implementations, selecting the duration of the TXOP in block 708 may be based at least in part on an amount or percentage of the first AP's frequency bandwidth allocated to the identified APs for the coordinated access point transmission session. In some aspects, the first AP may select the TXOP duration by determining an amount of the frequency bandwidth that was allocated to the identified APs, and increasing the TXOP duration by a proportional amount. For example, if the first AP allocates $1/N=½$ of the frequency bandwidth to the identified APs, the first AP may double (N=2) the TXOP duration. For another example, if the first AP allocates $1/N=⅓$ of the frequency bandwidth to the identified APs, the first AP may triple (N=3) the TXOP duration. In some aspects, the TXOP duration may be adjusted according to the following expression:

$$TXOP_{DUR} += TXOP_{DUR \times \Delta}, \text{ where } \Delta = BW_{SHARED}/(BW_{TOTAL} - BW_{RESERVED}),$$

where $TXOP_{DUR}$ refers to a standard TXOP duration, $TXOP_{DUR \times \Delta}$ refers to the TXOP duration selected by the first AP, $BW_{TOTAL}$ refers to the entire frequency bandwidth associated with the TXOP, $BW_{SHARED}$ refers to an amount or percentage of the total frequency bandwidth that was allocated to the identified APs, and $BW_{RESERVED}$ refers to an amount of the frequency bandwidth reserved for DL transmissions from the first AP.

Figure 8A:
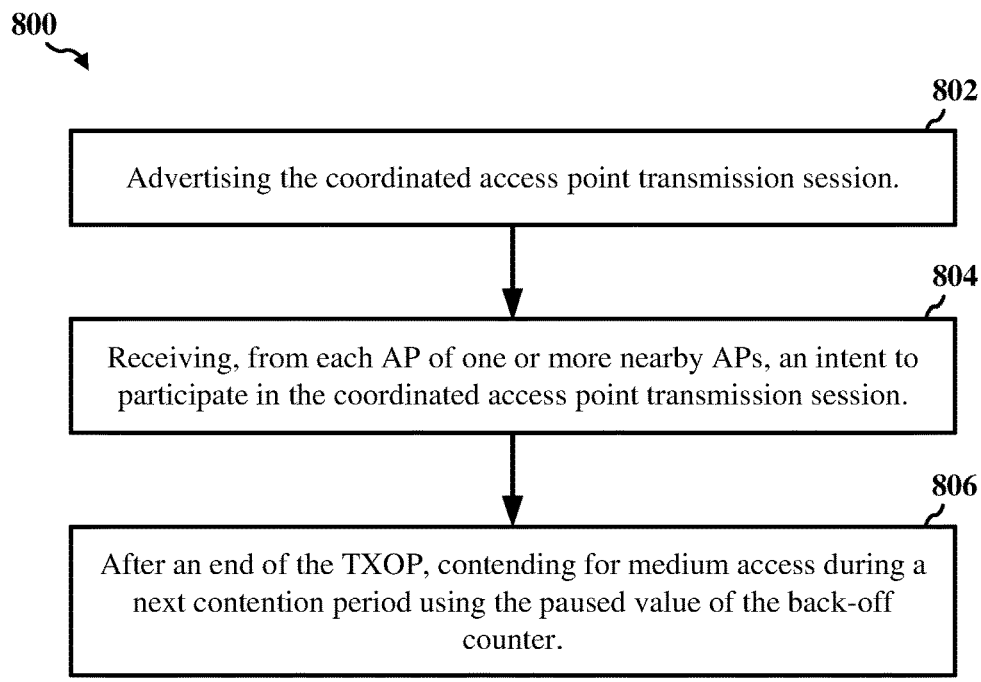
FIG. 8A shows a flowchart illustrating an example process for wireless communication according to some implementations.

FIG. 8A shows a flowchart illustrating an example process 800 for wireless communication according to some implementations. The process 800 may be performed by a wireless communication device such as the wireless communication device 500 described above with reference to FIG. 5. In some implementations, the process 800 may be performed by a wireless communication device operating as or within an AP, such as one of the APs 102 and 602 described above with reference to FIGS. 1 and 6A, respectively.

With reference for example to FIG. 7, the process 800 may be a more detailed implementation of the operation for identifying other APs to participate in the coordinated access point transmission session described in block 702 of the process 700. For example, the process 800 may begin, in block 802, with advertising the coordinated access point transmission session. In block 804, the process 800 proceeds with receiving, from each AP of one or more nearby APs, an intent to participate in the coordinated access point transmission session. In block 806, the process 800 proceeds with identifying the one or more APs participating in the coordinated access point transmission session based on the received responses.

In some implementations, advertising the coordinated access point transmission session in block 802 may include broadcasting information pertaining to the coordinated access point transmission session in a suitable management frame (such as a beacon frame).

In some implementations, a nearby AP may indicate the intent to participate in the coordinated access point transmission session in a suitable management frame or control frame such as, for example, a beacon frame. In some aspects, the nearby AP may also include capability information the suitable management frame or control frame. In other aspects, the nearby AP may transmit its intent to participate in the coordinated access point transmission session to the first AP based on a request from the first AP.

Figure 8B:
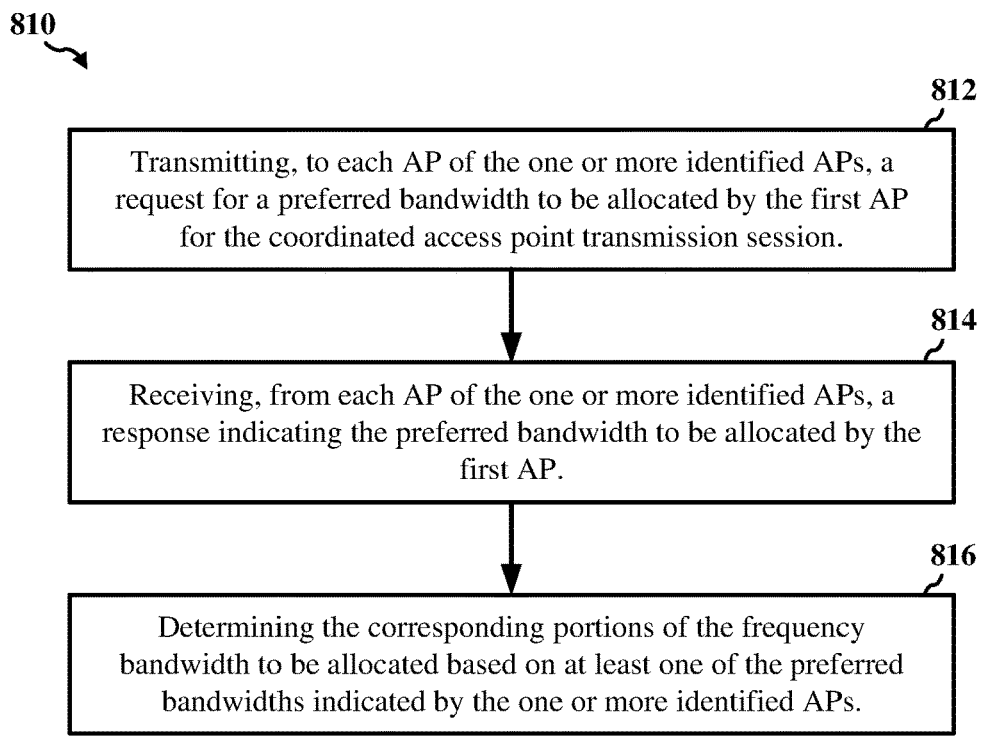
FIG. 8B shows a flowchart illustrating an example process for wireless communication according to some implementations.

FIG. 8B shows a flowchart illustrating an example process 810 for wireless communication according to some implementations. The process 810 may be performed by a wireless communication device such as the wireless communication device 500 described above with reference to FIG. 5. In some implementations, the process 810 may be performed by a wireless communication device operating as or within an AP, such as one of the APs 102 and 602 described above with reference to FIGS. 1 and 6A, respectively.

With reference for example to FIG. 7, the process 810 may be a more detailed implementation of the operation for allocating corresponding portions of the frequency bandwidth to the identified APs described in block 706 of the process 700. For example, the process 810 may begin, in block 812, with transmitting, to each AP of the one or more identified APs, a request for a preferred bandwidth to be allocated by the first AP for the coordinated access point transmission session. In block 814, the process 810 proceeds with receiving, from each AP of the one or more identified APs, a response indicating the preferred bandwidth to be allocated by the first AP. In block 816, the process 810 proceeds with determining the corresponding portions of the frequency bandwidth to be allocated based on at least one of the preferred bandwidths indicated by the one or more identified APs.

In some implementations, the request transmitted in block 812 may include a request to provide information indicating whether the nearby AP is capable of participating in coordinated access point transmission sessions. The request may also request one or more of a preferred frequency bandwidth to be allocated or a preferred number of spatial streams upon which the nearby AP is to transmit DL data. In some aspects, the request may be transmitted to the nearby APs in a trigger frame.

In some implementations, the response received in block 814 may include one or more of a capability of a respective nearby AP to participate in coordinated access point transmission sessions, a preferred frequency bandwidth to be allocated to the nearby AP, or a preferred number of spatial streams upon which the respective nearby AP is to transmit DL data.

Figure 8C:
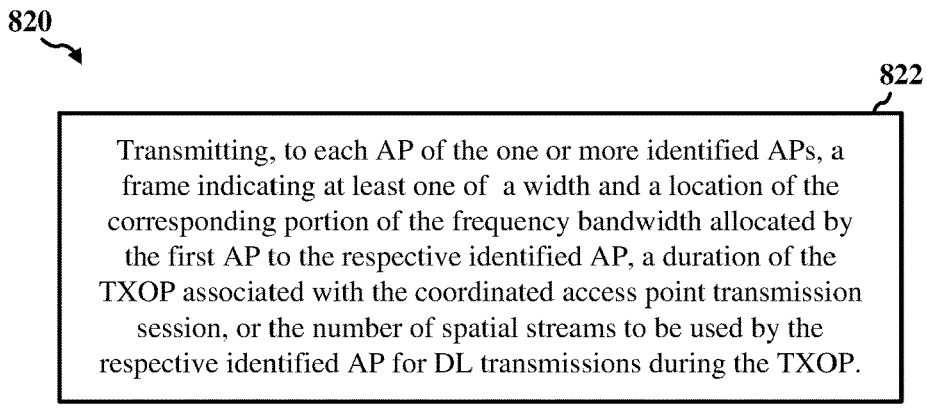
FIG. 8C shows a flowchart illustrating an example process for wireless communication according to some implementations.

FIG. 8C shows a flowchart illustrating an example process 820 for wireless communication according to some implementations. The process 820 may be performed by a wireless communication device such as the wireless communication device 500 described above with reference to FIG. 5. In some implementations, the process 820 may be performed by a wireless communication device operating as or within an AP, such as one of the APs 102 and 602 described above with reference to FIGS. 1 and 6A, respectively.

With reference for example to FIG. 7, the process 820 may be a more detailed implementation of the operation for outputting the information in block 710 of the process 700. For example, the process 820 may begin, in block 822, with transmitting, to each AP of the one or more identified APs, a frame indicating at least one of a width and a location of the corresponding portion of the frequency bandwidth allocated by the first AP to the respective identified AP, a duration of the TXOP associated with the coordinated access point transmission session, or the number of spatial streams to be used by the respective identified AP for DL transmissions during the TXOP. In some instances, the corresponding portions of the frequency bandwidth allocated by the first AP include one or more of resource units, a primary channel, or a secondary channel.

Figure 8D:
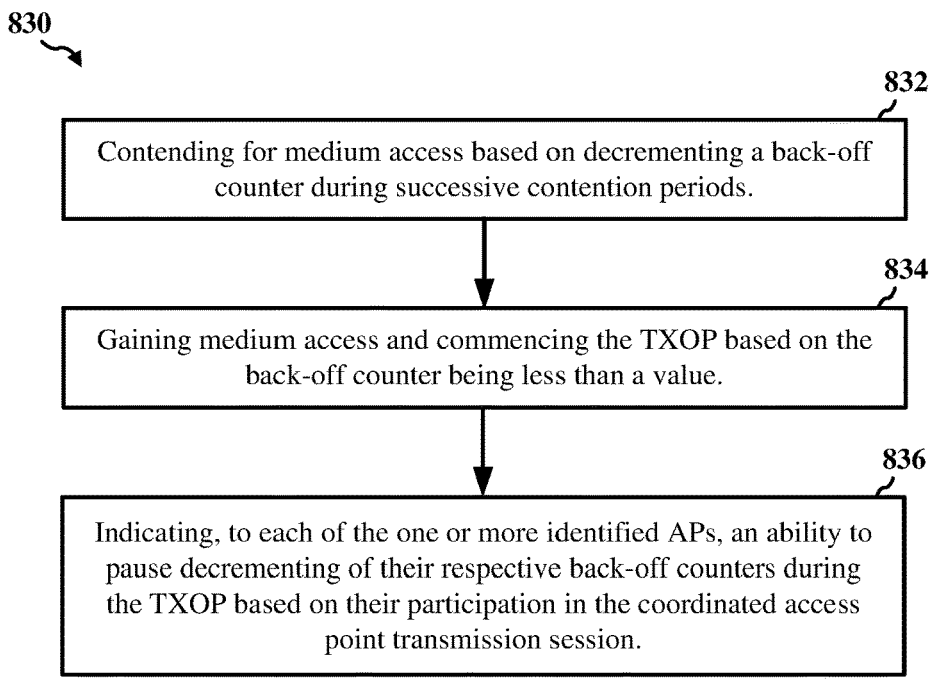
FIG. 8D shows a flowchart illustrating an example process for wireless communication according to some implementations.
Figure 8E:
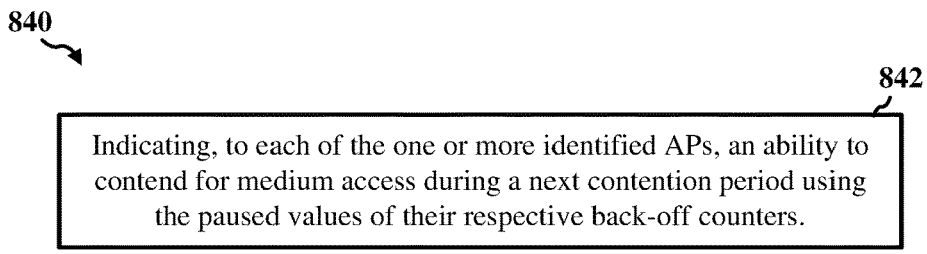
FIG. 8E shows a flowchart illustrating an example process for wireless communication according to some implementations.

FIG. 8D shows a flowchart illustrating an example process 830 for wireless communication according to some implementations. The process 830 may be performed by a wireless communication device such as the wireless communication device 500 described above with reference to FIG. 5. In some implementations, the process 830 may be performed by a wireless communication device operating as or within an AP, such as one of the APs 102 and 602 described above with reference to FIGS. 1 and 6A, respectively.

With reference for example to FIG. 7, the process 830 may be a more detailed implementation of the operation for obtaining the TXOP in block 704 of the process 700. For example, the process 830 may begin, in block 832, with contending for medium access based on decrementing a back-off counter during successive contention periods. In block 834, the process 830 proceeds with gaining medium access and commencing the TXOP based on the back-off counter being less than a value. In block 836, the process 830 proceeds with indicating, to each of the one or more identified APs, an ability to pause decrementing of their respective back-off counters during the TXOP based on their participation in the coordinated access point transmission session.

In some implementations, first AP and each of the identified APs may use a Distributed Coordination Function (DCF) to contend with each other for access to the wireless medium. For example, each of the APs senses the wireless medium, and after the wireless medium remains idle for the appropriate IFS (for example, the DIFS), each of the APs begins to decrement its back-off counter from a randomly selected value between 0 and CW, where CW is a contention window size. Each of the APs decrements its back-off counter by one slot each time the medium is sensed to be idle during a corresponding slot interval. The AP whose back-off counter reaches zero first during the contention period wins the contention operation.

In some implementations, pausing the back-off counter in block 836 may include maintaining the value of the back-off counter in each of the identified APs at a constant value during the TXOP, irrespective of wireless signal exchanges sensed by the first AP.

FIG. 9A shows a flowchart illustrating an example process 900 for wireless communication according to some implementations. The process 900 may be performed by a wireless communication device such as the wireless communication device 500 described above with reference to FIG. 5. In some implementations, the process 900 may be performed by a wireless communication device operating as or within an AP, such as one of the APs 102 and 602 described above with reference to FIGS. 1 and 6A, respectively.

In some implementations, the process 900 begins after the process 700 described with reference to FIG. 7. For example, the process 900 may begin in block 902, after outputting the information to the identified APs in block 710, with transmitting DL data on a portion of the frequency bandwidth reserved for the first AP concurrently with the transmissions of DL data from the one or more identified APs on their respective allocated portions of the frequency bandwidth. In some instances, DL data may be concurrently transmitted in block 902 as one or more of single-user multiple-input multiple-output (SU-MIMO) transmissions, multi-user MIMO (MU-MIMO) transmissions, or orthogonal frequency-division multiple access (OFDMA) transmissions. In some other instances, DL data may be transmitted from different APs using different transmission schemes. In some implementations, the transmissions of PPDUs from the first AP and the identified APs may begin at the same time. In addition, or in the alternative, the transmissions of PPDUs from the first AP and the identified APs may end at the same time.

FIG. 9B shows a flowchart illustrating an example process 910 for wireless communication according to some implementations. The process 910 may be performed by a wireless communication device such as the wireless communication device 500 described above with reference to FIG. 5. In some implementations, the process 910 may be performed by a wireless communication device operating as or within an AP, such as one of the APs 102 and 602 described above with reference to FIGS. 1 and 6A, respectively.

With reference for example to FIG. 9A, the process 910 may be performed concurrently with the operation for transmitting DL data in block 902. For example, the process 910 may begin in block 912 with temporally aligning DL transmissions from the first AP with DL transmissions from the one or more identified APs. In some implementations, the DL transmissions may be temporally aligned by temporally aligning one or more symbol boundaries of a protocol data unit to be transmitted from the first AP with corresponding symbol boundaries of a protocol data unit to be concurrently transmitted from at least one of the identified APs. In some aspects, the symbol boundaries may correspond to at least one of a HE-SIG-B field, an HE-LTF field, or an end of the packet.

FIG. 10 shows a flowchart illustrating an example process 1000 for wireless communication according to some implementations. The process 1000 may be performed by a wireless communication device such as the wireless communication device 500 described above with reference to FIG. 5. In some implementations, the process 1000 may be performed by a wireless communication device operating as or within an AP, such as one of the APs 102 and 602 described above with reference to FIGS. 1 and 6A, respectively.

In some implementations, the process 1000 begins after the process 700 described with reference to FIG. 7. For example, the process 1000 may begin in block 1002, after outputting the information to the identified APs in block 710, with adjusting the TXOP duration based on increases or decreases in the percentage or amount of the frequency bandwidth that is allocated to the one or more identified APs for one or more subsequent coordinated access point transmission sessions.

In some implementations, the TXOP duration may be adjusted according to the following expression:

$$TXOP_{DUR}+=TXOP_{DUR \times \Delta}, \text{ where } \Delta=BW_{SHARED}/(BW_{TOTAL}-BW_{RESERVED}),$$

where $TXOP_{DUR}$ refers to a standard TXOP duration, $TXOP_{DUR \times \Delta}$ refers to the TXOP duration selected by the first AP, $BW_{TOTAL}$ refers to the entire frequency bandwidth associated with the TXOP, $BW_{SHARED}$ refers to an amount or percentage of the total frequency bandwidth that was allocated to the identified APs, and $BW_{RESERVED}$ refers to an amount of the frequency bandwidth reserved for DL transmissions from the first AP.

In other implementations, the TXOP duration may be increased based on another suitable relationship with the amount of frequency bandwidth that was allocated to other wireless devices. In addition, or in the alternative, the first AP may adjust the TXOP duration based on increases or decreases in the percentage or amount of the frequency bandwidth allocated to the identified APs for one or more subsequent coordinated access point transmission sessions.

Figure 11:
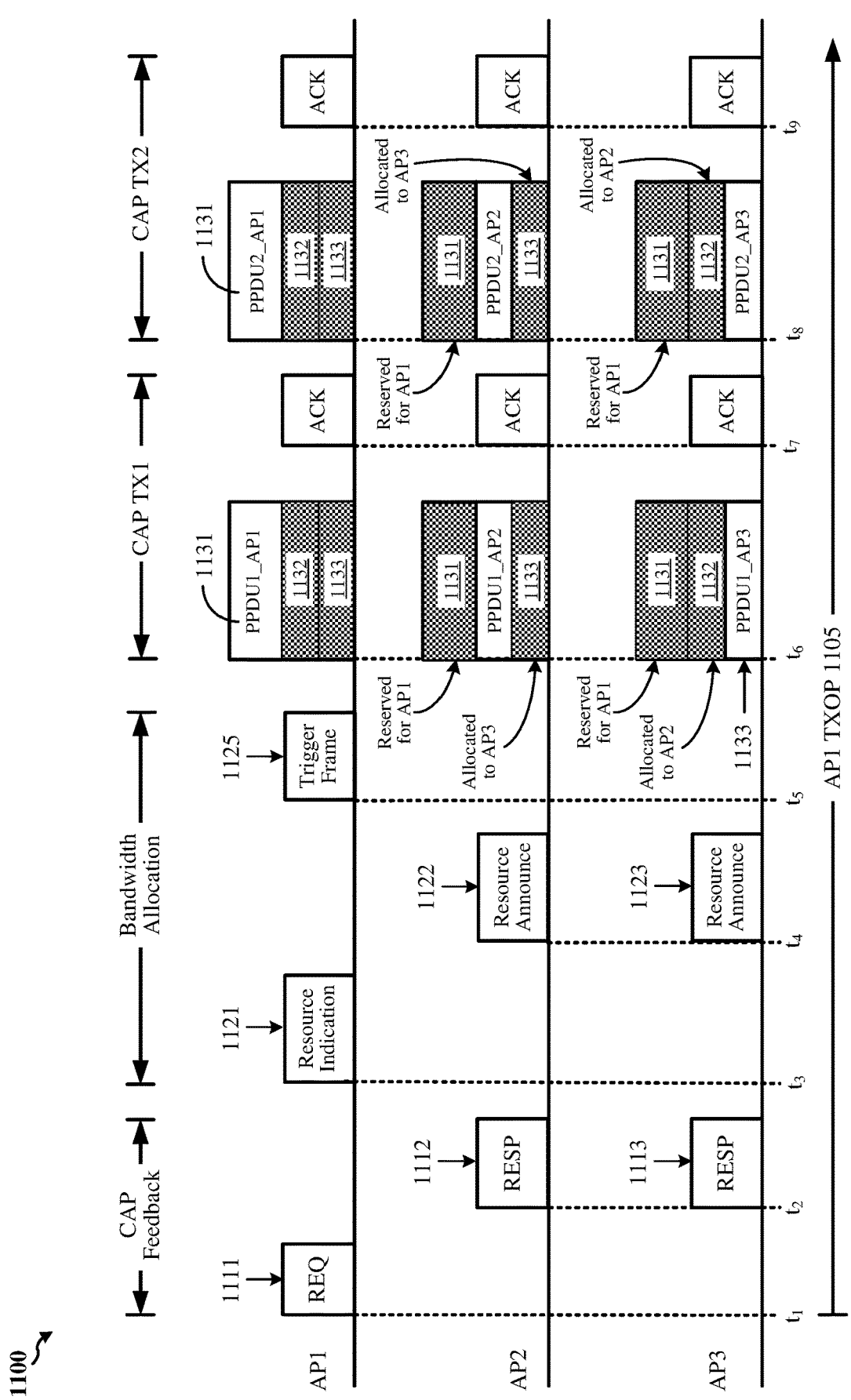
FIG. 11 shows a timing diagram illustrating the transmissions of communications in one example of the processes of FIGS. 7, 8A-8E, 9A-9B, and 10.

FIG. 11 shows a timing diagram 1100 illustrating the transmissions of communications in one example of the processes of FIGS. 7, 8A-8E, 9A-9B, and 10. In some implementations, the communications may be exchanged between a first access point (AP1), a second access point (AP2), and a third access point (AP3). Each of the access points AP1, AP2 and AP3 may be any suitable wireless communication device such as one of the APs 102 and 602 described above with reference to FIGS. 1 and 6A, respectively. Although the example timing diagram 1100 shows three access points AP1, AP2 and AP3, implementations of the subject matter disclosed herein may be used with any suitable number of access points (or other wireless devices).

Prior to time $t_1$, AP1 obtains a TXOP 1105 for transmissions over a frequency bandwidth. AP1 may obtain the TXOP 1105 by contending with other wireless devices (such as AP2 and AP3) for access to a wireless medium associated with the frequency bandwidth. In some implementations, AP1 and the other wireless devices may contend for medium access using a Distributed Coordination Function (DCF). As described above, the DCF may be implemented through the use of CSMA/CA and timing intervals (such as SIFS, DIFS, EIFS, and AIFS). For example, AP1 senses the wireless medium, and after the wireless medium remains idle for the appropriate IFS (for example, the DIFS), AP1 begins to decrement its back-off counter from a randomly selected value between 0 and CW, where CW is a contention window size. Other contending wireless devices such as AP2 and AP3 follow a similar procedure and randomly select initial values for their own back-off counters. Each of the access points AP1, AP2 and AP3 (and other contending wireless devices) decrements its back-off counter by one slot each time the medium is sensed to be idle during a corresponding slot interval. For the example of FIG. 11, AP1 selected the lowest back-off value such that its back-off counter reaches zero before the back-off counters associated with AP2 and AP3, and thus AP1 wins access to the wireless medium and obtains (and becomes the owner of) the TXOP 1105.

At time $t_1$, AP1 transmits a request frame 1111 to nearby access points such as AP2 and AP3. In some implementations, the request frame 1111 may solicit feedback information indicating the capability of each of AP2 and AP3 to participate in coordinated access point transmission sessions with AP1. The request frame 1111 may be any suitable management or control frame. In some aspects, the request frame 1111 may be a trigger frame that solicits feedback from AP2 and AP3.

Between times $t_1$ and $t_2$, AP2 and AP3 each receive the request frame 1111 transmitted from APL. In response thereto, AP2 and AP3 transmit respective response frames 1112 and 1113 to AP1. The response frame 1112 may indicate whether AP2 is capable of participating in coordinated access point transmission sessions, and the response frame 1113 may indicate whether AP3 is capable of participating in coordinated access point transmission sessions. In some implementations, the response frame 1112 may indicate a preferred bandwidth for allocation to AP2 during the coordinated access point transmission session, may indicate a preferred number of spatial streams to be used by AP2 during the coordinated access point transmission session, or both. Similarly, the response frame 1113 may indicate a preferred bandwidth for allocation to AP3 during the coordinated access point transmission session, may indicate a preferred number of spatial streams to be used by AP3 during the coordinated access point transmission session, or both. In some implementations, the exchange of request frame 1111 and response frames 1112 and 1113 may be associated with a coordinated access point (CAP) multi-user (MU) feedback operation.

In other implementations, the CAP MU feedback operation may not be performed, for example, because AP1 may have already obtained feedback and capability information pertaining to AP2 and AP3. In some other implementations, AP2 and AP3 (and other nearby APs) may include CAP MU feedback and capability information (such as a preferred frequency bandwidth to be allocated and a preferred number of spatial streams to be used for DL transmissions) in any suitable management or control frame. In some aspects, AP2 and AP3 (and other nearby APs) may include CAP MU feedback and capability information in beacon frames, and AP1 may decode the capability information from one or more of such beacon frames.

AP1 receives the response frames 1112 and 1113, and decodes the information contained therein to determine the capabilities of AP2 and AP3, to determine the preferred bandwidths of AP2 and AP3, to determine the preferred number of spatial streams to be used by AP2 and AP3, or any combination thereof. In some implementations, AP1 may use the feedback and capability information provided in the response frames 1112 and 1113 to determine an amount of its frequency bandwidth to be allocated to each of AP2 and AP3 for DL transmissions during the coordinated access point transmission session. For example, the TXOP 1105 may be associated with an 80 MHz frequency bandwidth, and AP1 may reserve a first 40 MHz portion of the frequency bandwidth, may allocate a second 20 MHz portion of the frequency bandwidth to AP2, and may allocate a third 20 MHz portion of the frequency bandwidth to AP3. In some aspects, AP1 may generate a resource allocation table or bitmap indicating the amount and location of the portions of the frequency bandwidth to be allocated to AP2 and AP3.

At time $t_3$, AP1 outputs information indicative of the corresponding portions of the frequency bandwidth to be allocated to AP2 and AP3 for the coordinated access point transmission session. In some implementations, AP1 transmits a frame 1121 indicating the width and location of the corresponding portions of the frequency bandwidth allocated to AP2 and AP3. The indication frame 1121 may also indicate the number of spatial streams to be used by each of AP2 and AP3 for DL transmissions during the coordinated access point transmission session. In addition, or in the alternative, the indication frame 1121 may indicate the duration of TXOP associated with the coordinated access point transmission session.

Between times $t_3$ and $t_4$, each of AP2 and AP3 receive and decode the indication frame 1121 to determine the width and location of the frequency bandwidth portions allocated by AP1 for coordinated access point transmissions during the TXOP, to determine the (maximum) number of spatial streams to be used for DL transmissions during the TXOP, to determine the duration of the TXOP, or any combination thereof. In some implementations, the corresponding portions of the frequency bandwidth allocated by AP1 may include one or more of resource units, a primary channel, or a secondary channel.

At time $t_4$, AP2 may transmit a frame 1122 announcing or advertising information pertaining to the frequency bandwidth allocated to AP2 by AP1, and AP3 may transmit a frame 1123 announcing or advertising information pertaining to the frequency bandwidth allocated to AP3 by AP1. The announcement frame 1122 transmitted by AP2 may inform wireless devices associated with AP2 of the width and location of the allocated portion of the frequency bandwidth, for example, so that wireless devices associated with AP2 may prepare to receive DL transmissions from AP2 on the frequency bandwidth allocated by AP1. Similarly, the announcement frame 1123 transmitted by AP3 may inform wireless devices associated with AP3 of the width and location of the allocated portion of the frequency bandwidth, for example, so that wireless devices associated with AP3 may prepare to receive DL transmissions from AP3 on the frequency bandwidth allocated by AP1. In addition, the announcement frames 1122 and 1123 may indicate the number of spatial streams to be used by AP2 and AP3, respectively, and may indicate the duration of TXOP associated with the coordinated access point transmission session.

In some implementations, the announcement frames 1122 and 1123 may be identical to each other (such as having the same format, having the same transmit durations, and containing the same information) and may be transmitted at the same time (such as concurrently). In this manner, if AP2 and AP3 both operate on the same primary channel, then transmission of the announcement frames 1122 and 1123 may have little (if any) interference with each other. In addition, by constructing the announcement frames 1122 and 1123 to have the same (or at least similar) waveforms and to contain the same resource allocation information, nearby wireless devices may receive and decode any one of the announcement frames 1122 and 1123 to determine the width and location of the frequency bandwidth portions allocated to each of AP2 and AP3.

In some implementations, the frequency bandwidth allocated to AP2 by AP1 may be different than the primary channel used by AP2, the frequency bandwidth allocated to AP3 by AP1 may be different than the primary channel used by AP3, or both. In this manner, the announcement frames 1122 and 1123 may inform wireless devices associated with AP2 and AP3 as to the particular channel or frequency bandwidth upon which AP2 and AP3 are to transmit DL data during the coordinated access point transmission session. In some implementations, the information contained in the announcement frames 1122 and 1123 may be derived from the bandwidth allocation information provided by AP1 in the indication frame 1121.

In some implementations, AP1 may transmit a trigger frame 1125 to AP2 and AP3 at time $t_5$. The trigger frame 1125 may include synchronization information that can be used by each of AP2 and AP3 to temporally align a number of symbol boundaries of protocol data units to be transmitted from AP2 and AP3 with each other and with corresponding symbol boundaries of protocol data units to be transmitted from AP1. In some implementations, AP1 may use the synchronization information to temporally align symbol boundaries of protocol data units to be transmitted from AP1 with corresponding symbol boundaries of protocol data units to be transmitted from AP2 and AP3. Similarly, AP2 may use the synchronization information to temporally align symbol boundaries of protocol data units to be transmitted from AP2 with corresponding symbol boundaries of protocol data units to be transmitted from AP1 and AP3, and AP3 may use the synchronization information to temporally align symbol boundaries of protocol data units to be transmitted from AP3 with corresponding symbol boundaries of protocol data units to be transmitted from AP1 and AP2. In some implementations, the symbol boundaries may correspond to at least one of a HE-SIG-B field, an HE-LTF field, or an end of the protocol data unit. In other implementations, other symbol boundaries of transmitted data units may be used to temporally align DL transmissions from AP1, AP2 and AP3.

In one or more implementations, the trigger frame 1125 may also include indications of the frequency bandwidth portions allocated by AP1, a TXOP duration, number of spatial streams to be used, and other suitable information pertaining to the concurrent transmission of DL data from AP1, AP2, and AP3 during the coordinated access point transmission session. In some aspects, transmission of the indication frame 1121, the announcement frames 1122 and 1123, and the trigger frame may be associated with a bandwidth allocation operation. In other implementations, AP1 may not transmit the trigger frame 1125.

AP1 may select a duration for the TXOP 1105 based at least in part on an amount of the frequency bandwidth allocated to AP2 and AP3 for the coordinated access point transmission session. In some implementations, the TXOP duration may be selected based on an amount or percentage of frequency bandwidth that was allocated to other wireless devices by AP1. In some aspects, AP1 (as the TXOP owner) may increase the TXOP duration by a factor of N, where N indicates an amount or percentage of the frequency bandwidth allocated by AP1 to other wireless devices such as AP2 and AP3. Using the example in which the TXOP 1105 is associated with an 80 MHz frequency bandwidth, and AP1 allocates a 20 MHz portion of the frequency bandwidth to AP2, allocates another 20 MHz portion of the frequency bandwidth to AP3, and reserves a 40 MHz portion of the frequency bandwidth for itself, the amount or percentage of the frequency bandwidth allocated by AP1 to other wireless devices may be expressed as $40/(20+20)=\frac{1}{2}=50\%$, and AP1 may increase the TXOP duration by a factor of N=2 (such as by doubling a standard TXOP duration). In some aspects, the TXOP 1105 may initially be set to a standard value, and AP1 may increase the TXOP duration by multiplying the standard value by the value of N.

At time $t_6$, AP1 transmits a MU DL protocol data unit (PPDU1_AP1) on a first portion 1131 of the frequency bandwidth, AP2 transmits a MU DL protocol data unit (PPDU1_AP2) on a second portion 1132 of the frequency bandwidth, and AP3 transmits a MU DL protocol data unit (PPDU1_AP3) on a third portion 1133 of the frequency bandwidth, concurrently. In some implementations, the transmission of each of the first MU DL data units PPDU1_AP1, PPDU1_AP2, and PPDU1_AP3 also ends at the same time (at least substantially the same time), for example, such that any acknowledgements of the first MU DL data units PPDU1_AP1, PPDU1_AP2, and PPDU1_AP3 are transmitted concurrently from corresponding receiving devices.

The second portion 1132 may correspond to the frequency band allocated by AP1 to AP2, the third portion 1133 may correspond to the frequency band allocated by AP1 to AP3, and the first portion 1131 may correspond to the remaining portion of the frequency bandwidth (such as after allocation of the second and third portions to AP2 and AP3, respectively) upon which AP1 may transmit DL data. In some aspects, the remaining portion of the frequency bandwidth may be referred to as the reserved portion of the frequency bandwidth. Using the above example in which the frequency bandwidth associated with the TXOP 1105 is 80 MHz, AP1 may transmit PPDU1_AP1 using a 40 MHz portion of the frequency bandwidth (such as portion 1131), AP2 may transmit PPDU1_AP2 using a 20 MHz portion of the frequency bandwidth (such as portion 1132), and AP3 may transmit PPDU1_AP3 using a 20 MHz portion of the frequency bandwidth (such as portion 1133).

The first MU DL protocol data units PPDU1_AP1, PPDU1_AP2, and PPDU1_AP3 may be transmitted using any suitable MU transmission schemes such as MU-MIMO or OFDMA. In some implementations, one or more of the first MU DL protocol data units PPDU1_AP1, PPDU1_AP2, and PPDU1_AP3 may be transmitted using different MU transmission schemes, one or more of the first MU DL protocol data units PPDU1_AP1, PPDU1_AP2, and PPDU1_AP3 may be transmitted using different numbers of antennas, or both.

Between times $t_6$ and $t_7$, one or more wireless devices associated with AP1 receives PPDU1_AP1, and each of those receiving wireless devices transmits an acknowledgement (ACK) frame to AP1 at time $t_7$. Similarly, one or more wireless devices associated with AP2 receives PPDU1_AP2 between times $t_6$ and $t_7$, and each of those receiving wireless devices transmits an ACK frame to AP2 at time $t_7$. One or more wireless devices associated with AP3 receives PPDU1_AP3 between times $t_6$ and $t_7$, and each of those receiving wireless devices transmits an ACK frame to AP3 at time $t_7$. In some aspects, the transmission of the first MU DL protocol data units PPDU1_AP1, PPDU1_AP2, and PPDU1_AP3 and their corresponding ACK frames may correspond to a first coordinated access point transmission (CAP TX1).

In some instances, after receiving one or more ACK frames, AP1 transmits another MU DL protocol data unit (PPDU2_AP1) on the first portion 1131 of the frequency bandwidth, AP2 transmits another MU DL protocol data unit (PPDU2_AP2) on the second portion 1132 of the frequency bandwidth, and AP3 transmits another MU DL protocol data unit (PPDU2_AP3) on the third portion 1133 of the frequency bandwidth, concurrently. The second MU DL protocol data units PPDU2_AP1, PPDU2_AP2, and PPDU3_AP3 may be transmitted using any suitable MU transmission schemes such as MU-MIMO or OFDMA. In some implementations, one or more of the second MU DL protocol data units PPDU2_AP1, PPDU2_AP2, and PPDU3_AP3 may be transmitted using different MU transmission schemes, one or more of the second MU DL protocol data units PPDU2_AP1, PPDU2_AP2, and PPDU3_AP3 may be transmitted using different numbers of antennas, or both. In some implementations, the transmission of each of the first MU DL protocol data units PPDU1_AP1, PPDU1_AP2, and PPDU1_AP3 also ends at the same time (at least substantially the same time), for example, such that any acknowledgements of the first MU DL protocol data units PPDU1_AP1, PPDU1_AP2, and PPDU1_AP3 are transmitted concurrently from corresponding receiving devices.

Between times $t_8$ and $t_9$, one or more wireless devices associated with AP1 receives PPDU2_AP1, and each of those receiving wireless devices transmits an ACK frame to AP1 at time $t_9$. Similarly, one or more wireless devices associated with AP2 receives PPDU2_AP2 between times $t_8$ and $t_9$, and each of those receiving wireless devices transmits an ACK frame to AP2 at time $t_9$. And one or more wireless devices associated with AP3 receives PPDU2_AP3 between times $t_8$ and $t_9$, and each of those receiving wireless devices transmits an ACK frame to AP3 at time $t_9$. In some aspects, the transmission of the first MU DL data units PPDU1_AP1, PPDU1_AP2, and PPDU1_AP3 and their corresponding ACK frames may correspond to a second coordinated access point transmission (CAP TX2).

Although only two coordinated access point transmissions are shown in FIG. 11, the TXOP 1105 may include any suitable number of DL transmissions from AP1, AP2 and AP3 that temporally fit within the TXOP duration (as may be adjusted by AP1, depending on the amount of the frequency bandwidth allocated to AP2 and AP3).

In some implementations, each of AP2 and AP3 may pause decrementing its back-off counter during the TXOP 1105 based on their participation in the coordinated access point transmission session. After the end of the TXOP 1105, each of AP2 and AP3 may contend for medium access during the next contention period using the paused value of its respective back-off counter, rather than selecting a new random back-off number from which to begin decrementing. In other implementations, each of AP2 and AP3 may reset its back-off counter after the end of the TXOP 1105.

Figure 12:
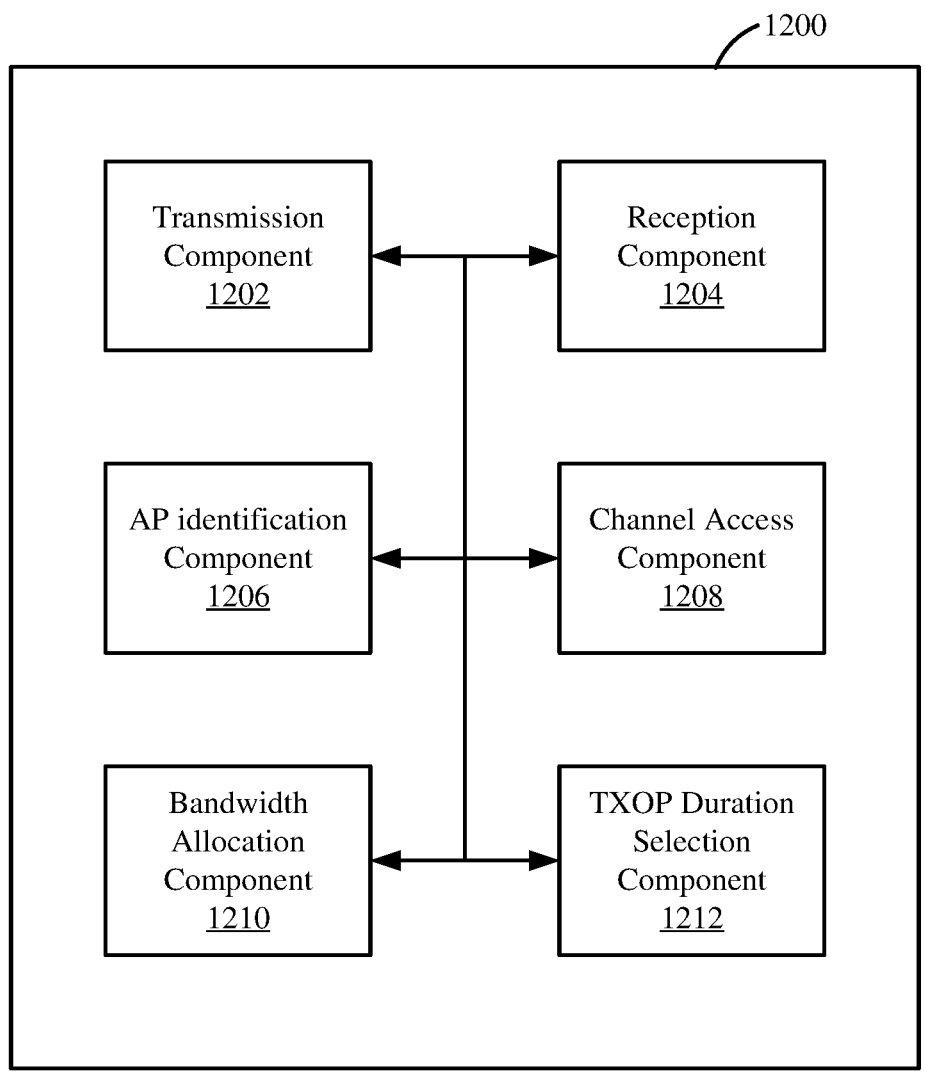
FIG. 12 shows a block diagram of an example wireless communication device according to some implementations.

FIG. 12 shows a block diagram of an example wireless communication device 1200 according to some implementations. In some implementations, the wireless communication device 1200 is configured to perform one or more of the processes 700, 800, 810, 820, 830, 840, 900, 910, and 1000 described above with reference to FIGS. 7, 8A-8E, 9A-9B, and 10, respectively. The wireless communication device 1200 may be an example implementation of the wireless communication device 500 described above with reference to FIG. 5. For example, the wireless communication device 1700 can be a chip, SoC, chipset, package or device that includes at least one processor (such as the processor 502), at least one modem (for example, a Wi-Fi (IEEE 802.11) modem or a cellular modem such as the modem 504), at least one memory (such as the memory 508), and at least one radio (such as the radio 506). In some implementations, the wireless communication device 1200 can be a device for use in a STA, such as one of the STAs 104 and 604 described above with reference to FIGS. 1 and 6B, respectively. In some other implementations, the wireless communication device 1200 can be a STA that includes such a chip, SoC, chipset, package or device as well as at least one antenna (such as the antennas 625).

The wireless communication device 1200 includes a transmission component 1202, a reception component 1204, an AP identification component 1206, a channel access component 1208, a bandwidth allocation component 1210, and a TXOP duration selection component 1212. Portions of one or more of the components 1202, 1204, 1206, 1208, 1210, and 1212 may be implemented at least in part in hardware or firmware. For example, the transmission component 1202, the reception component 1204, and the channel access component 1208 may be implemented at least in part by a modem (such as the modem 502). In some implementations, at least some of the components 1202, 1204, 1206, 1208, 1210, and 1212 are implemented at least in part as software stored in a memory (such as the memory 508). For example, portions of one or more of the components 1202, 1204, 1206, 1208, 1210, and 1212 can be implemented as non-transitory instructions (or "code") executable by a processor (such as the processor 506) to perform the functions or operations of the respective module.

The transmission component 1202 is configured to transmit frames or packets to one or more other wireless communication devices on a wireless medium.

The reception component 1204 is configured to receive frames or packets from one or more other wireless communication devices on the wireless medium.

The AP identification component 1206 is configured to identify one or more other APs capable of participating in coordinated access point transmission sessions with the first AP. In some implementations, the AP identification component 1206 may receive an intent to participate in the coordinated access point transmission session from one or more nearby APs.

The channel access component 1208 is configured to contend for medium access and obtain a TXOP for transmitting wireless signals over a frequency bandwidth. In some implementations, the channel access component 1208 may use a DCF or an EDCA mechanism to contend with other wireless communication devices for access to the wireless medium.

The bandwidth allocation component 1210 is configured to allocate, to each of the identified APs, a corresponding portion of the frequency bandwidth for DL transmissions during the TXOP. In some implementations, the bandwidth allocation component 1210 may allocate portions of the frequency bandwidth to the identified APs based on indications of preferred bandwidths received from the identified APs.

The TXOP duration selection component 1212 is configured to select a duration of the TXOP based at least in part on an amount or percentage of the frequency bandwidth allocated to the identified APs for the coordinated access point transmission session.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a first access point (AP), comprising:
    identifying one or more other APs to participate with the first AP in a coordinated access point transmission session;
    allocating, to each AP of the one or more identified APs, a corresponding portion of a frequency bandwidth for use during a TXOP;
    selecting a duration of the TXOP for the coordinated access point transmission session based at least in part on an amount or percentage of the frequency bandwidth that is allocated to at least one of the one or more identified APs for the coordinated access point transmission session;
    transmitting, to each AP of the one or more identified APs, information indicative of the duration of the TXOP and the corresponding portion of the frequency bandwidth allocated to the respective AP;

transmitting, to each AP of the one or more identified APs, information indicative of a timing associated with one or more symbols of a first protocol data unit (PDU) to be transmitted by the first AP; and transmitting the first PDU in accordance with the timing.

2. The method of claim 1, wherein the identifying comprises:

advertising the coordinated access point transmission session;

receiving, from each AP of one or more nearby APs, information indicating a request to participate in the coordinated access point transmission session; and identifying the one or more APs participating in the coordinated access point transmission session based on the information received from the one or more nearby APs.

3. The method of claim 1, wherein the allocating comprises:

transmitting, to each AP of the one or more identified APs, a request for a preferred bandwidth to be allocated by the first AP for the coordinated access point transmission session;

receiving, from each AP of the one or more identified APs, a response indicating the preferred bandwidth to be allocated by the first AP; and determining the corresponding portions of the frequency bandwidth to be allocated to the one or more identified APs based on at least one of the preferred bandwidths indicated by the one or more identified APs.

4. The method of claim 3, wherein the response further indicates a preferred number of spatial streams to be used by the respective identified AP for the coordinated access point transmission session.

5. The method of claim 1, further comprising transmitting, to each AP of the one or more identified APs, an indication of a number of spatial streams to be used by the respective identified AP for transmissions during the TXOP.

6. The method of claim 1, wherein each of the corresponding portions of the frequency bandwidth allocated by the first AP includes a respective resource unit.

7. The method of claim 1, further comprising transmitting a frame that solicits the identified APs to advertise their respective corresponding portions of the frequency bandwidth.

8. The method of claim 1, wherein the first AP transmits the first PDU concurrently with transmissions of PDUs from the one or more identified APs on their respective corresponding portions of the frequency bandwidth.

9. The method of claim 1, wherein transmitting the information indicative of the timing associated with the one or more symbols of the first PDU comprises transmitting a trigger frame that includes the information indicative of the timing.

10. The method of claim 1, further comprising:

contending for medium access based on decrementing a back-off counter during successive contention periods;

gaining medium access and commencing the TXOP based on the back-off counter being less than a value; and indicating, to each of the one or more identified APs, an ability to pause decrementing of the respective back-off counter of the identified AP during the TXOP.

11. The method of claim 10, further comprising:

indicating, to each of the one or more identified APs, an ability to contend for medium access during a next contention period using the paused values of their respective back-off counters.

12. A first wireless access point (AP) comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to perform operations comprising:

identifying one or more other APs to participate with the first AP in a coordinated access point transmission session;

allocating, to each AP of the one or more identified APs, a corresponding portion of a frequency bandwidth for use during a TXOP;

selecting a duration of the TXOP for the coordinated access point transmission session based at least in part on an amount or percentage of the frequency bandwidth that is allocated to at least one of the one or more identified APs for the coordinated access point transmission session;

transmitting, to each AP of the one or more identified APs, information indicative of the duration of the TXOP and the corresponding portion of the frequency bandwidth allocated to the respective AP;

transmitting, to each AP of the one or more identified APs, information indicative of a timing associated with one or more symbols of a first protocol data unit (PDU) to be transmitted by the first AP; and transmitting the first PDU in accordance with the timing.

13. The first AP of claim 12, wherein execution of the processor-readable code for identifying the one or more other APs causes the first AP to perform operations further comprising:

advertising the coordinated access point transmission session;

receiving, from each AP of one or more nearby APs, information indicating a request to participate in the coordinated access point transmission session; and identifying the one or more APs participating in the coordinated access point transmission session based on the information received from the one or more nearby APs.

14. The first AP of claim 12, wherein execution of the processor-readable code for allocating the corresponding portions causes the first AP to perform operations further comprising:

transmitting, to each AP of the one or more identified APs, a request for a preferred bandwidth to be allocated by the first AP for the coordinated access point transmission session;

receiving, from each AP of the one or more identified APs, a response indicating the preferred bandwidth to be allocated by the first AP; and determining the corresponding portions of the frequency bandwidth to be allocated to the one or more identified APs based on at least one of the preferred bandwidths indicated by the one or more identified APs.

15. The first AP of claim 14, wherein the response further indicates a preferred number of spatial streams to be used by the respective identified AP for the coordinated access point transmission session.

16. The first AP of claim 12, wherein execution of the processor-readable code further causes the first AP to transmit, to each AP of the one or more identified APs, an indication of a number of spatial streams to be used by the respective identified AP for transmissions during the TXOP.

17. The first AP of claim 12, wherein each of the corresponding portions of the frequency bandwidth allocated by the first AP includes a respective resource unit.

18. The first AP of claim 12, wherein execution of the processor-readable code further causes the first AP to transmit a frame that solicits the identified APs to advertise their respective corresponding portions of the frequency bandwidth.

19. The first AP of claim 12, wherein the first AP transmits the first PDU concurrently with transmissions of PDUs from the one or more identified APs on their respective corresponding portions of the frequency bandwidth.

20. The first AP of claim 12, wherein transmitting the information indicative of the timing associated with the one or more symbols of the first PDU comprises transmitting a trigger frame that includes the information indicative of the timing.

21. The first AP of claim 12, wherein execution of the processor-readable code further causes the first AP to perform operations comprising:
 contending for medium access based on decrementing a back-off counter during successive contention periods;
 gaining medium access and commencing the TXOP based on the back-off counter being less than a value; and
 indicating, to each of the one or more identified APs, an ability to pause decrementing of the respective back-off counter of the identified AP during the TXOP.

22. The first AP of claim 21, wherein execution of the processor-readable code further causes the first AP to perform operations comprising:
 after an end of the TXOP, resetting the back-off counter of the first AP and indicating, to each of the one or more identified APs, an ability to contend for medium access during a next contention period using the paused values of their respective back-off counters.

\* \* \* \* \*